US012576940B2

(12) United States Patent
Sokolow

(10) Patent No.: US 12,576,940 B2
(45) Date of Patent: Mar. 17, 2026

(54) VEHICLE HANDLE SAFETY DEVICE CONTROL SYSTEM AND METHOD

(71) Applicant: Pandro Sokolow, Santa Monica, CA (US)

(72) Inventor: Pandro Sokolow, Santa Monica, CA (US)

( * ) Notice: Subject to any disclaimer, the term of this patent is extended or adjusted under 35 U.S.C. 154(b) by 0 days.

(21) Appl. No.: 18/607,360

(22) Filed: Mar. 15, 2024

(65) Prior Publication Data

US 2024/0308616 A1 Sep. 19, 2024

Related U.S. Application Data

(63) Continuation-in-part of application No. 17/461,788, filed on Aug. 30, 2021, now Pat. No. 12,420,884.

(60) Provisional application No. 63/071,866, filed on Aug. 28, 2020.

(51) Int. Cl.
*B62K 23/02* (2006.01)
*B62K 11/14* (2006.01)

(52) U.S. Cl.
CPC .............. *B62K 23/02* (2013.01); *B62K 11/14* (2013.01)

(58) Field of Classification Search
CPC ..................................... B62J 3/12; B62J 3/14
See application file for complete search history.

(56) References Cited

U.S. PATENT DOCUMENTS

| | | | |
|---|---|---|---|
| 4,222,040 A | * | 9/1980 | Benson ..................... G10K 9/12 |
| | | | 340/384.4 |
| 5,083,108 A | | 1/1992 | Guest |

| | | | |
|---|---|---|---|
| 5,262,757 A | | 11/1993 | Hansen |
| 5,617,303 A | | 4/1997 | Izzo, Sr. |
| 5,857,061 A | | 1/1999 | Chang et al. |
| 6,216,060 B1 | | 4/2001 | Kishimoto |
| 6,317,036 B1 | * | 11/2001 | Popat ......................... B62J 3/10 |
| | | | 340/432 |
| 7,479,611 B1 | | 1/2009 | Robson |
| 8,493,194 B1 | * | 7/2013 | Shoolman .................. B62J 3/12 |
| | | | 340/432 |
| 9,079,533 B2 | | 7/2015 | Pottier et al. |

(Continued)

FOREIGN PATENT DOCUMENTS

| | | | | | |
|---|---|---|---|---|---|
| CN | 2308940 Y | * | 2/1999 | | |
| CN | 204452687 U | | 7/2015 | | |
| CN | 112591000 A | * | 4/2021 | ............... | B62J 3/10 |
| GB | 2494124 A | | 3/2013 | | |

(Continued)

OTHER PUBLICATIONS

Bike Forums.net, Car Horn Installation, retrieved from: [https://www.bikeforums.net/commuting/370869-car-horn-installation.html], Nov. 2005.

(Continued)

*Primary Examiner* — Daniel D Yabut
(74) *Attorney, Agent, or Firm* — The Roy Gross Law Firm, LLC; Roy D. Gross

(57) ABSTRACT

A vehicle control handle safety device control which may be activated without the disengagement of a finger or thumb of a user from the vehicle control handle allowing a user to maintain a full hand grip on the vehicle control handle itself while concurrently activating the safety device control. In particular, the present invention relates to safety control device which is removably affixed to a vehicle control handle grip such as that of a bicycle or other such similar conveyance or vehicle.

17 Claims, 20 Drawing Sheets

(56) References Cited

U.S. PATENT DOCUMENTS

| | | | |
|---|---|---|---|
| 10,442,483 | B2 | 10/2019 | Xing |
| 2006/0285343 | A1 | 12/2006 | Okajima et al. |
| 2008/0047388 | A1 | 2/2008 | Lachance |
| 2008/0114519 | A1 | 5/2008 | DuFaux et al. |
| 2008/0271962 | A1 | 11/2008 | Kelsen |
| 2009/0102627 | A1* | 4/2009 | Russell .................... B62J 6/056 |
| | | | 340/432 |
| 2012/0283894 | A1 | 11/2012 | Naboulsi |
| 2014/0118128 | A1* | 5/2014 | Orzeck ...................... B62J 6/16 |
| | | | 340/432 |
| 2021/0120905 | A1 | 4/2021 | Burry et al. |
| 2021/0179223 | A1 | 6/2021 | Charalampous et al. |
| 2021/0347425 | A1 | 11/2021 | Vianello |
| 2022/0119067 | A1* | 4/2022 | Powers .................... G06F 3/167 |
| 2022/0126948 | A1 | 4/2022 | Kruisselbrink et al. |

FOREIGN PATENT DOCUMENTS

| | | | | |
|---|---|---|---|---|
| GB | 2545255 | A * | 6/2017 | ................ B62J 3/00 |
| WO | 2012100289 | A1 | 8/2012 | |

OTHER PUBLICATIONS

Youtube.com, Anoying people with a car horn on my bicycle, retrieved from: [https://www.youtube.com/watch?v=Vm6HoOOous4], on May 29, 2008.

Bike Forums.net, Electronics, Lighting, & Gadgets, Best, smallest, and loudest electronic horn. retrieved from: [https://www.bikeforums.net/electronics-lighting-gadgets/360349-best-smallest-loudest-eletronic-horn.html]. Nov. 2007-Dec. 2008.

Youtube.com, Bicycle Lights and Horn sounds, retrieved from: [https://www.youtube.com/watch?v=mQ8Ur75e3HU] on Mar. 6, 2012.

Youtube.com, BikeBell—Almost Real Bike Bell App for Symbian, Retrieved from: [https://www.youtube.com/watch?v=XA8ITP2ifNU] on Oct. 3, 2010.

Bike Forums.net,Car horn Installation retrieved from: [https://www.bikeforums.net/commuting/370869-car-horn-installation.html].

WOLO-mfg.com, Electric horns, retrieved from: [http://web.archive.org/web/19970214110300/http:/www.wolo-mfg.com/elec.htm.].

Instructables.com, Putting a car horn on your bicycle!, Retrieved from: [https://www.instructables.com/Putting-A-Car-Horn-On-Your-Bicycle/], Quotes from comments dated May 10, 2009. Published Oct. 19, 2008.

Manta.com,WOLO Manufacturing Corp, retrieved from: [https://www.manta.com/c/mmf0hy9/wolo-manufacturing-corp].

Kickstarter.com, Loud Bicycle: Car horn for your bike, Retrieved from: [https://www.kickstarter.com/projects/lansey/loud-bicycle-car-horns-for-cyclists] on Nov. 7, 2015.

Bikeforums.net, Electronics, Lighting, & Gadgets, Total Geekiness, Retrieved from: [https://www.bikeforums.net/electronics-lighting-gadgets/42629-total-geekiness-21.html].

* cited by examiner

Grip Alert
SPEAKER COMPONENT

= pvc / silicon

= plastic with metalic silver coating

= plastic with metalic silver coating

FLAT VIEW
BACK

500

FLAT VIEW
FRONT

500

TOP VIEW:
SPEAKER FACE

500

PROFILE: STRETCHED

500

PROFILE: RELAXED

500

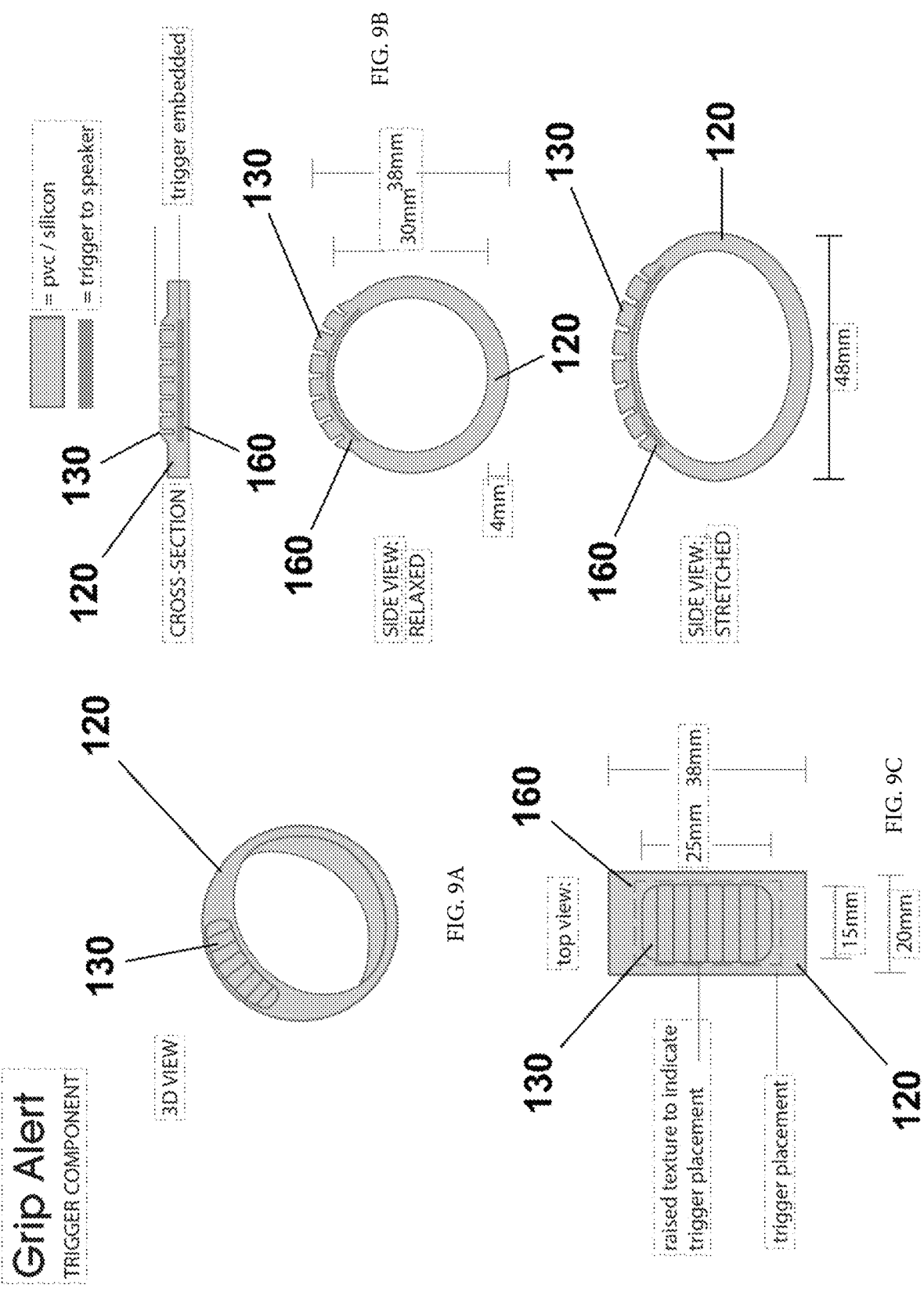

500

130

VEHICLE HANDLE SAFETY DEVICE CONTROL SYSTEM AND METHOD

CROSS REFERENCE TO RELATED APPLICATIONS

The present application is a continuation-in-part of U.S. patent application Ser. No. 17/461,788 entitled, "VEHICLE HANDLE SAFETY DEVICE CONTROL SYSTEM AND METHOD" filed Aug. 30, 2021, which claims priority to U.S. Provisional Patent Application Ser. No. 63/071,866, filed Aug. 28, 2020. The contents of both applications are herein incorporated by reference in their entirety.

FIELD OF THE INVENTION

The present invention is directed to a vehicle control handle safety device control which may be activated without the disengagement of a finger or thumb of a user from the vehicle control handle; thus, allowing a user to maintain a full hand grip on the vehicle control handle itself while concurrently activating the safety device control.

In particular, the present invention relates to a safety control device which is removably affixed or connects to a vehicle control handle grip such as that of a bicycle or other such similar conveyance or vehicle.

BACKGROUND OF THE INVENTION

Traditional and known "bicycle horn", "bicycle bell", and "bicycle light" options require moving one's thumb to depress a button or other such lever or activator. This requires at least a partial loosening of one's grip on a vehicle control handle; and many times, requiring a vehicle user to look down at the grip/button/lever to ensure correct placement of a thumb or finger at a correct location for safety device activation.

In some known related systems; some vehicle control handles, such as motorcycle grips, include a "rotary throttle" and may include other controls such as lights on/off, turn signals, and the like. In like manner; some human power-driven bicycles include a "rotary gear shift" integrated into a handle-bar grip.

All these known systems require a user in some manner, to fully or partially disengage their grip on a vehicle control handle to activate a button or lever which either mechanically or electronically engages or disengages a vehicle control or safety system. Such systems may be as simple as a lever activated mechanical bell affixed to a handlebar; or as complex as the rotary throttle or gear shift previously described.

Regardless, known systems require the loosening of one's hand grip to activate a control and/or safety system; of which creates safety and performance disadvantages for the vehicle user; and, in many cases for those around the vehicle user.

SUMMARY OF THE INVENTION

What is desired is a method and system to control a vehicle safety system from a vehicle control handle which allows a user to maintain a full grip upon the vehicle control handle itself.

It is an object of the instant invention to provide an activation system for a control or safety system of a vehicle, the activation system comprising; a switch secured between a vehicle control handle and the hand of a vehicle user; whereby when a vehicle user engages the switch the activation system enables and/or disables a vehicle control or safety system; the activation system being integral or affixed to the vehicle control handlebar.

It is an object of the instant invention, whereby the vehicle is a bicycle or motorcycle.

It is an object of the instant invention to provide an activation system wherein the switch is a pressure sensitive switch of a selected sensitivity which precludes unintentional engagement of the activation system during the intended use of the vehicle control handlebar.

In certain embodiments, engagement of the activation system involves squeezing the pressure sensitive switch while the user's hand remains on the vehicle handlebar.

In certain embodiments, squeezing the pressure sensitive switch while the user's hand remains on the vehicle handlebar both triggers a speaker element as well as a brake.

It is an object of the instant invention to provide an activation system wherein the selected sensitivity is variable as selected by a user in the field.

It is an object of the instant invention to provide an activation system wherein the activation system is resistant to water intrusion.

It is an object of the instant invention to provide an activation system wherein the switch is positioned under or within an elastic band including tactile indica of an activation area on the elastic band to facilitate intentional user activation and mitigate unintentional user activation.

It is an object of the instant invention to provide an activation system wherein the switch is a hall effect magnetic switch activated by a magnet or magnetic field conductive material worn by a system user which when placed in sufficient proximity to the hall effect magnetic switch activates the hall effect switch to enable or disable a control or safety system of a vehicle.

It is an object of the instant invention to provide an activation system wherein the activation system is integral to the vehicle control handlebar.

It is an object of the instant invention to provide an activation system wherein the activation system comprises a kit for aftermarket installation on an existing vehicle control handlebar.

It is an object of the instant invention to provide an activation system wherein the activation system is electronic and powered by a replaceable battery.

It is an object of the instant invention to provide an activation system wherein the activation system is electronic and powered by a battery which charge is maintained by a photovoltaic cell.

It is an object of the instant invention to provide an activation system wherein the activation system is electronic and in wired communication with a vehicle control or safety system.

It is an object of the instant invention to provide an activation system wherein the activation system is electronic and in wireless communication with a vehicle control or safety system.

It is an object of the instant invention to provide an activation system wherein the activation system enables and disables an audio and or visible warning indica.

It is an object of the instant invention to provide an activation method of vehicle control or safety system activation, the method comprising the steps of; providing and securing a switch between a vehicle control handlebar and the hand of a vehicle user; whereby when a vehicle user engages the switch the activation system enables and/or disables a vehicle control or safety system; the activation system being integral or affixed to the vehicle control handlebar.

It is an object of the instant invention, whereby the vehicle is a bicycle or motorcycle.

It is an object of the instant invention to provide an activation method wherein the provided switch is a pressure sensitive switch of a selected sensitivity which precludes unintentional engagement of the activation system during the intended use of the vehicle control handlebar.

It is an object of the instant invention to provide an activation method wherein the selected sensitivity is variable as selected by a user in the field.

It is an object of the instant invention to provide an activation method wherein the provided switch is positioned under or within an elastic band including tactile indica of an activation area on the elastic band to facilitate intentional user activation and mitigate unintentional user activation.

It is an object of the instant invention to provide an activation method wherein the provided switch is a hall effect magnetic switch activated by a magnet or magnetic field conductive material worn by a system user which when placed in sufficient proximity to the hall effect magnetic switch activates the hall effect switch to enable or disable a control or safety system of a vehicle.

It is an object of the instant invention to provide an activation method wherein the provided activation system is integral to the vehicle control handlebar.

It is an object of the instant invention to provide an activation method wherein the provided activation system comprises a kit for aftermarket installation on an existing vehicle control handlebar.

It is an object of the instant invention to provide an activation method wherein the provided activation system is electronic and powered by a replaceable battery.

It is an object of the instant invention to provide an activation method wherein the provided activation system is electronic and powered by a battery which charge is maintained by a photovoltaic cell.

It is an object of the instant invention to provide an activation method wherein the provided activation system is electronic and in wired communication with a vehicle control or safety system.

It is an object of the instant invention to provide an activation method wherein the provided activation system is electronic and in wireless communication with a vehicle control or safety system.

It is an object of the instant invention to provide an activation method wherein the provided activation system enables and disables an audio and or visible warning indica.

It is an object of the instant invention to provide a vehicle warning system, comprising: an elastic band comprising: a speaker component, and a trigger component having a switch, wherein the elastic band is integral or affixed to a handlebar on the vehicle, wherein when a user engages the switch, the speaker is enabled and provides a warning sound, and wherein the user is able to engage the switch without removing the user's hand from the handlebar.

In certain embodiments, the engagement of the switch involves the user squeezing the handlebar.

It is an object of the instant invention to provide a vehicle warning audio indica system, comprising; a switch secured between a vehicle control handlebar and the hand of a user; wherein when a user engages the switch the vehicle warning indica system is enabled and/or disabled; wherein the activation system is removably affixed to the vehicle control handlebar; and wherein the user is able to engage the switch without removing the user's hand from the handlebar, thereby allowing the user to maintain a full hand grip on the vehicle control handlebar itself while concurrently activating warning audio indica system via the switch.

It is an object of the instant invention to provide a system wherein the switch is a pressure sensitive switch of a selected sensitivity which precludes unintentional engagement of the activation system during the intended use of the vehicle control handlebar.

It is an object of the instant invention to provide a system wherein the selected sensitivity is variable as selected by a user.

It is an object of the instant invention to provide a system wherein the vehicle warning audio indica system is resistant to water intrusion.

It is an object of the instant invention to provide a system wherein the switch is positioned under or within an elastic band including tactile indica of an activation area on the elastic band to facilitate intentional user activation and mitigate unintentional user activation of the switch.

It is an object of the instant invention to provide a system wherein the vehicle warning audio indica system is removably affixed to the vehicle control handlebar.

It is an object of the instant invention to provide a wherein the vehicle warning audio indica system comprises a kit for aftermarket installation on an existing vehicle control handlebar.

It is an object of the instant invention to provide a system wherein the vehicle warning audio indica system is electronic and powered by a replaceable or nonreplaceable battery.

It is an object of the instant invention to provide a system wherein the vehicle warning audio indica system is electronic and powered by a battery which charge is maintained by a photovoltaic cell.

It is an object of the instant invention to provide a system wherein the vehicle warning audio indica system is electronic and in wired communication with the switch.

It is an object of the instant invention to provide a method of activation control of a vehicle warning audio indica system, the method comprising the steps of: providing an vehicle warning audio indica system removably affixed to a vehicle control handlebar; and providing a switch, in communication with the vehicle warning audio indica system, between a vehicle control handle and the hand of a user; and engaging the switch to enable and/or disable the vehicle warning audio indica system, wherein the engagement of the switch occurs when the user maintains a full grip upon the vehicle control handlebar itself, thereby allowing the user to main a full hand grip on the vehicle control handlebar itself while concurrently activating the vehicle warning audio indica system via the switch.

It is an object of the instant invention to provide a method wherein the provided switch is a pressure sensitive switch of a selected sensitivity which precludes unintentional engagement of the vehicle warning audio indica system during the intended use of the vehicle control handlebar.

It is an object of the instant invention to provide a method wherein the selected switch sensitivity is variable as selected by a user.

It is an object of the instant invention to provide a method wherein the provided switch is positioned under or within an elastic band including tactile indica of an activation area on the elastic band to facilitate intentional user activation and mitigate unintentional user activation of the vehicle warning audio indica system.

It is an object of the instant invention to provide a vehicle warning system, comprising; an elastic band comprising: a speaker component, and a trigger component having a switch, wherein the elastic band is removably affixed to a handlebar on the vehicle; wherein when a user engages the switch, the speaker is enabled and provides a warning sound, and wherein the user is able to engage the switch without removing the user's hand from the handlebar, thereby allowing the user to maintain a full hand grip on the handlebar itself while concurrently activating the vehicle warning system.

It is an object of the instant invention to provide a vehicle warning system wherein the engagement of the switch involves the user squeezing the handlebar.

Other objects of the invention are achieved by providing a vehicle warning audio indica system, comprising; a one-piece switch and audio warning system secured on a vehicle control handlebar, the switch configured to be actuated by a hand of a user without the user removing the hand from the handlebar, thereby increasing user safety; wherein when a user engages the switch, the audio warning system is enabled and/or disabled; wherein the vehicle warning audio indica system is removably affixed to the vehicle control handlebar; and wherein the user is able to engage the switch without removing the user's hand from the handlebar, thereby allowing the user to maintain a full hand grip on the vehicle control handlebar itself while concurrently activating the warning system via the switch.

In certain embodiments, the switch is a pressure sensitive switch of a selected sensitivity which precludes unintentional engagement of the switch during the intended use of the vehicle control handlebar.

In certain embodiments, the selected sensitivity is variable as selected by the user.

In certain embodiments, the vehicle warning audio indica system is resistant to water intrusion.

In certain embodiments, the one-piece switch and audio warning system is positioned under or within an elastic band including tactile indica of an activation area on the elastic band to facilitate intentional user activation and mitigate unintentional user activation of the switch.

In certain embodiments, the one-piece switch and audio warning system is removably affixed to the vehicle control handlebar.

In certain embodiments, the one-piece switch and audio warning system comprises a kit for aftermarket installation on an existing vehicle control handlebar.

In certain embodiments, the audio warning system is electronic and powered by a replaceable or nonreplaceable battery.

In certain embodiments, the audio warning system is electronic and powered by a battery which charge is maintained by a photovoltaic cell.

In certain embodiments, the audio warning system is electronic and in wired communication with the switch.

In certain embodiments, the one-piece switch and audio warning system comprises: a speaker box; a flange element extending outwardly from the speaker box; and an attachment element, the attachment element configured to attach the one-piece switch and audio warning system to the vehicle control handlebar.

In certain embodiments, the switch is located on the flange element extending outwardly from the speaker box.

In certain embodiments, the attachment element is a stretchable band that wraps around the vehicle control handlebar.

In certain embodiments, the attachment element is secured via a buckle.

In certain embodiments, the speaker box includes control buttons to increase or decrease the volume of the speaker.

Other objects of the invention are achieved by providing a method of activation control of a vehicle warning audio indica system, the method comprising the steps of: providing a vehicle warning audio indica system; removably affixing the system to a vehicle control handlebar; and engaging the switch to enable and/or disable the audio warning system, wherein the engagement of the switch occurs when the user maintains a full grip upon the vehicle control handlebar itself, thereby allowing the user to main a full hand grip on the vehicle control handlebar itself while concurrently activating the audio warning system via the switch.

In certain embodiments, the provided switch is a pressure sensitive switch of a selected sensitivity which precludes unintentional engagement of the vehicle warning audio indica system during the intended use of the vehicle control handlebar.

In certain embodiments, the selected switch sensitivity is variable as selected by a user.

In certain embodiments, the provided switch is positioned under or within an elastic band including tactile indica of an activation area on the elastic band to facilitate intentional user activation and mitigate unintentional user activation of the vehicle warning audio indica system.

Other objects of the invention are achieved by providing a vehicle warning system, comprising: an elastic band comprising: a speaker component, and a trigger component having a switch, wherein the elastic band is removably affixed to a handlebar on the vehicle; wherein when a user engages the switch, the speaker is enabled and provides a warning sound, wherein the user is able to engage the switch without removing the user's hand from the handlebar, thereby allowing the user to maintain a full hand grip on the handlebar itself while concurrently activating the vehicle warning system, and wherein the engagement of the switch involves the user squeezing the handlebar.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 9A-9C depicts orthogonal and cross-sectional depictions of an embodiment of instant invention.

DETAILED DESCRIPTION OF THE INVENTION

As depicted in FIG. 1 through FIG. 4, the inventive system and method provides an activation system (100) either integral or affixed to a vehicle control handlebar (110).

Figure 1:
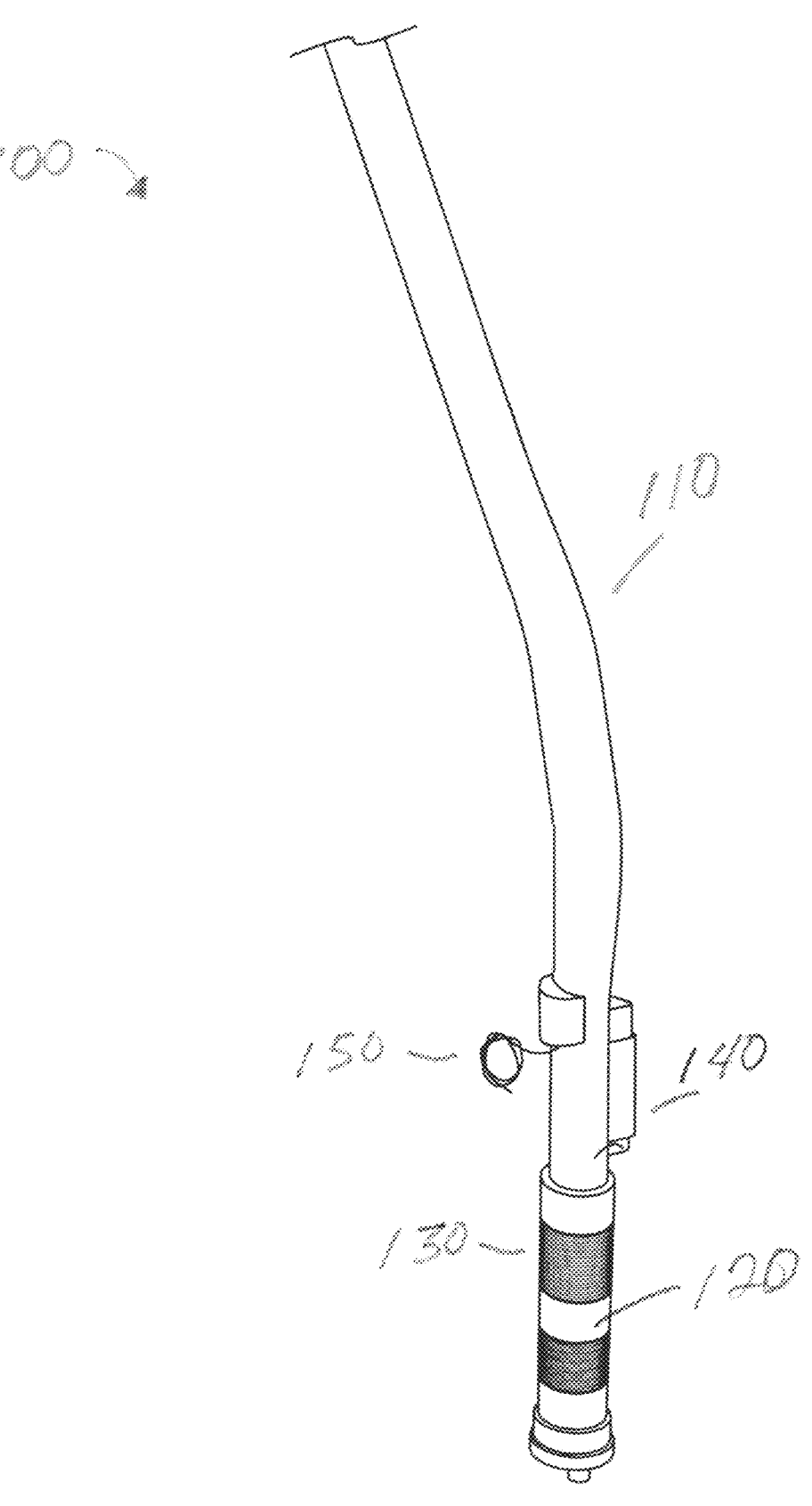
FIGS. 1-4 depict an embodiment of the invention.
Figure 2:
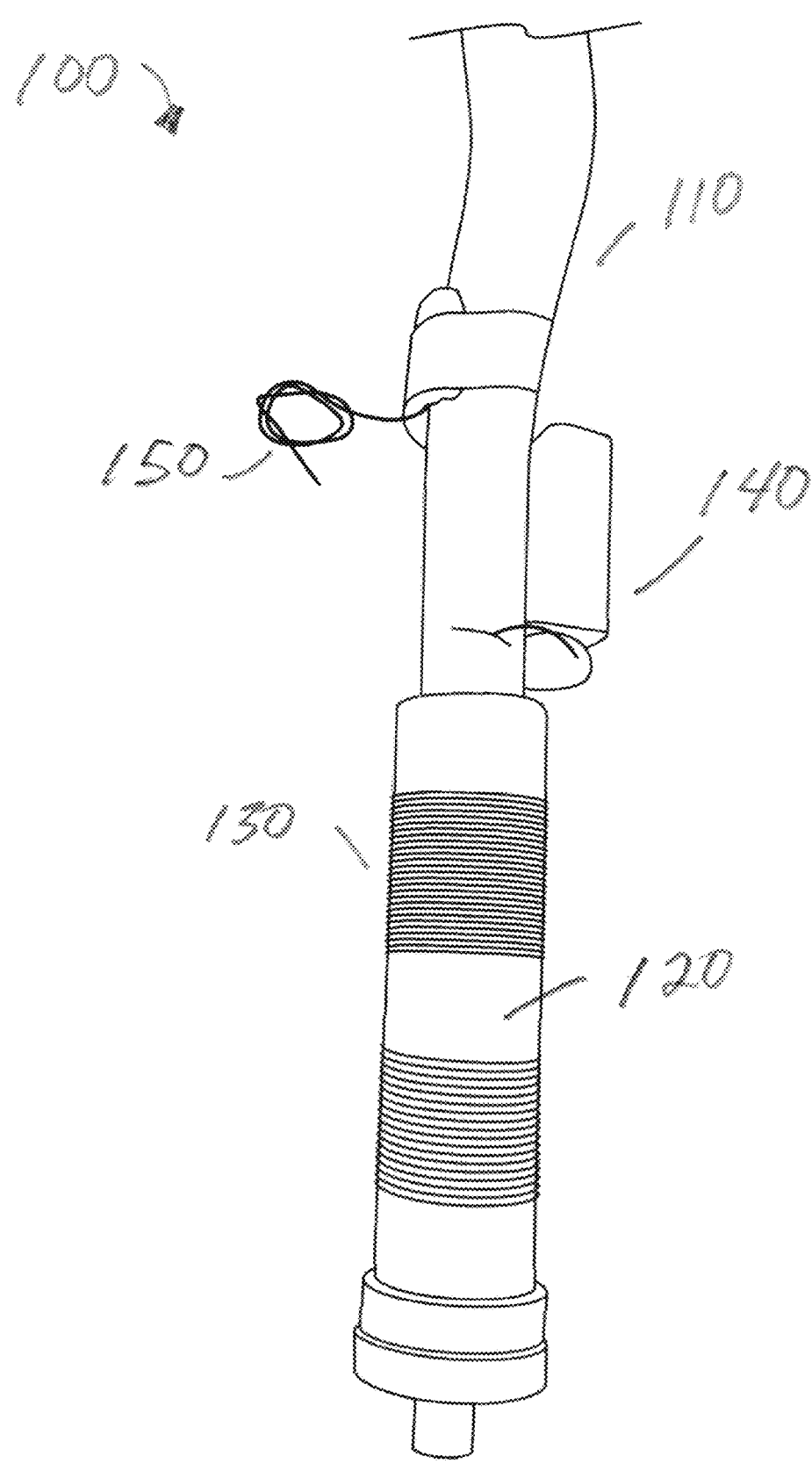
Figure 3:
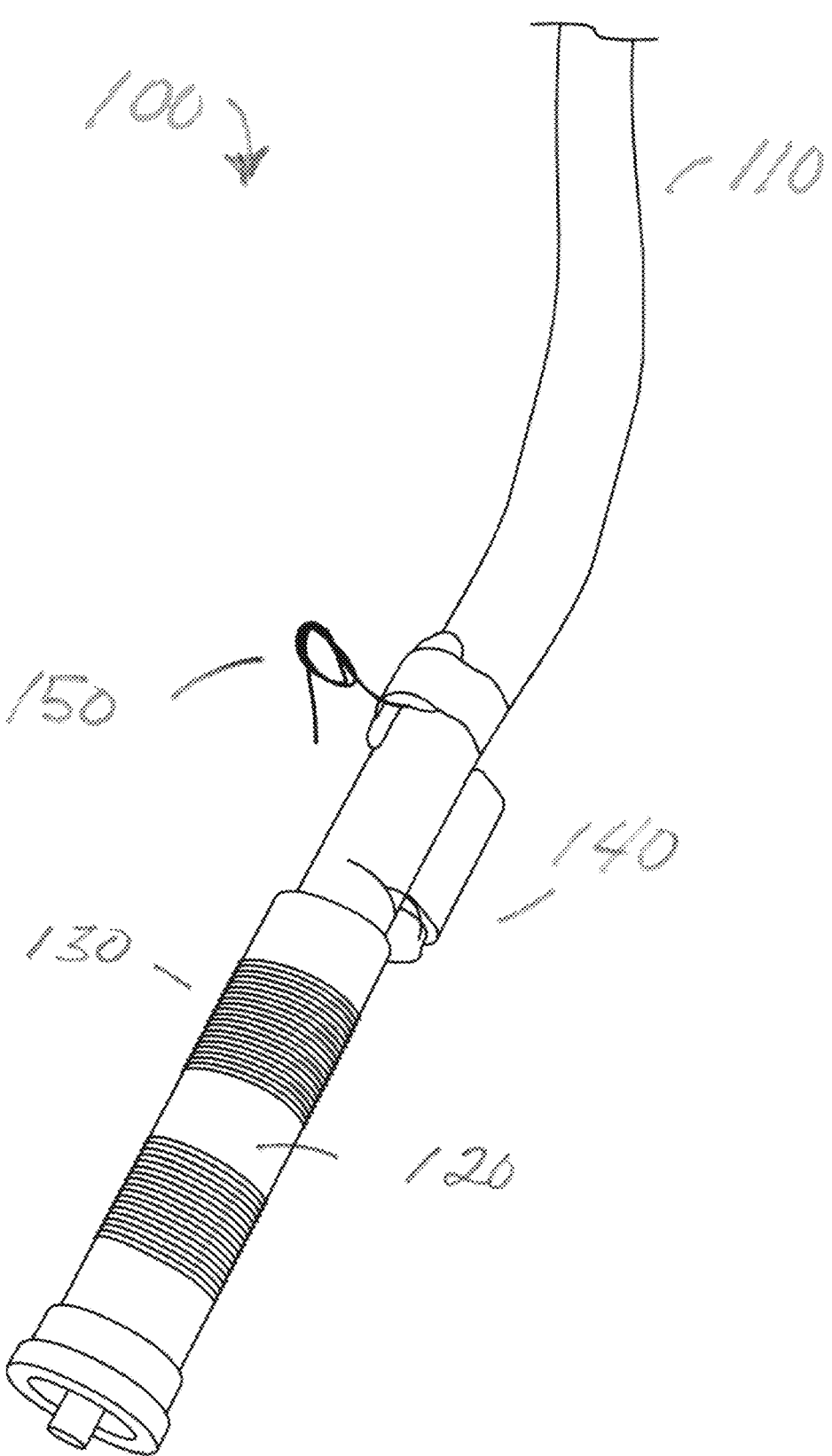
Figure 4:
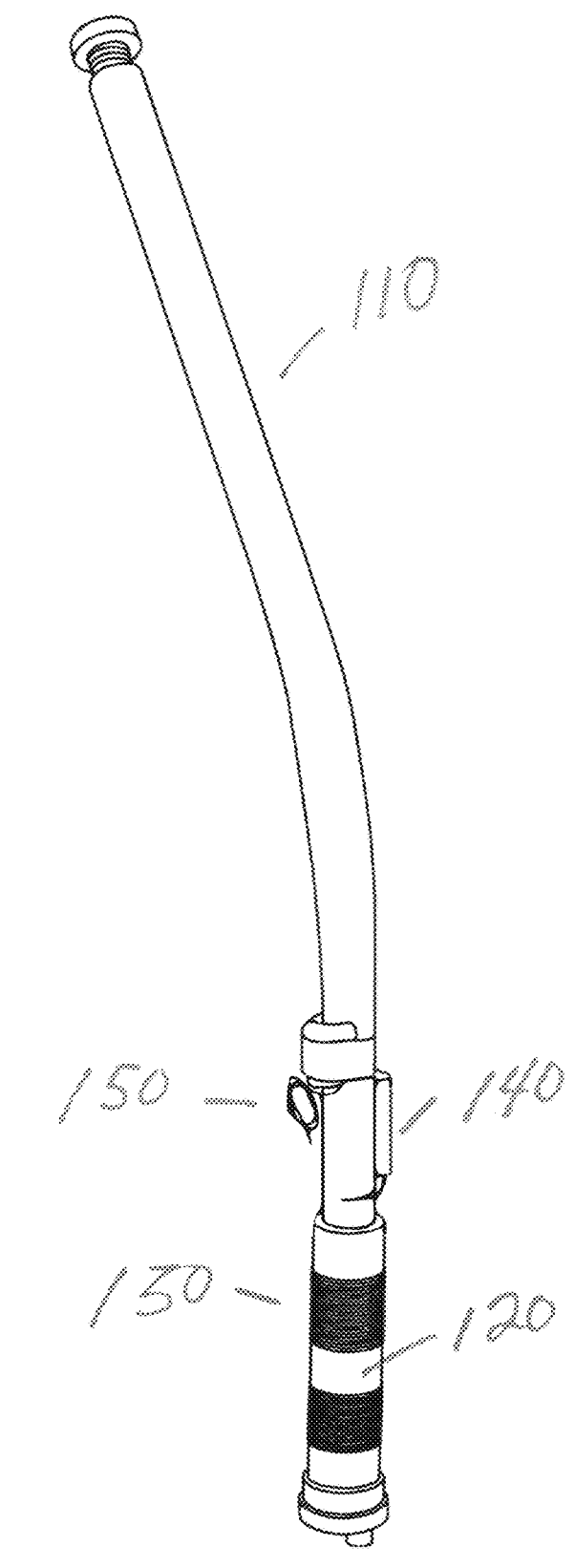
Figure 5:
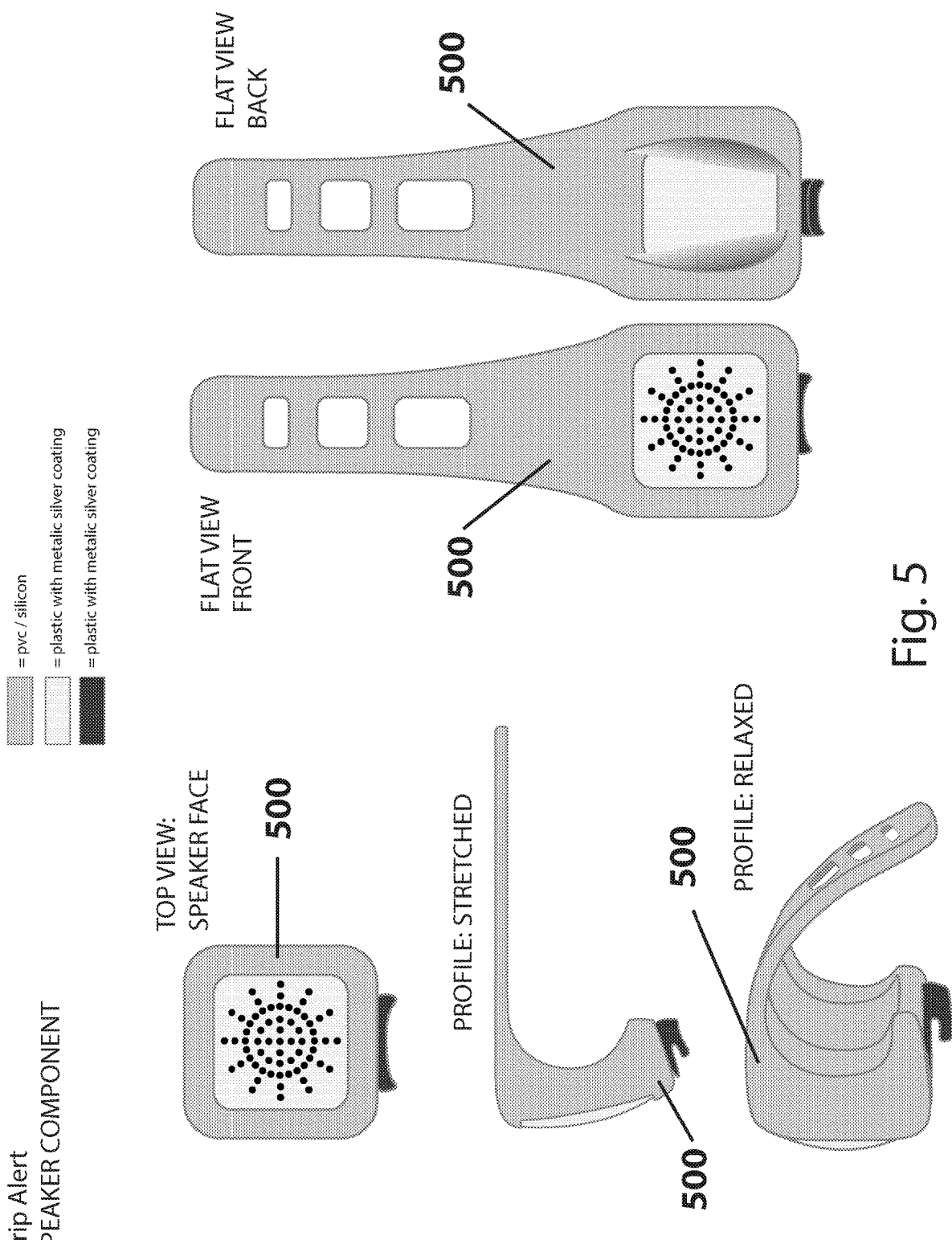
FIG. 5 depicts orthogonal depictions of an embodiment of an audio indica aspect of the instant invention.

The activation system (100) may embody an elastic or semi-elastic grip (120) integral to or affixed to (that is "slipped onto" the end of a ridged handlebar (110)) and powered by a battery (140) and in wireless communication (150) with a remotely located vehicle control or safety system such as depicted in FIG. 5 (or other such system or device not shown).

In certain embodiments, the battery is enclosed within the speaker device shown in FIG. 5. In certain embodiments, a replaceable or rechargeable battery is provided as well as a charging cable similar to charging a cellular phone to charge the speaker device.

It is contemplated that the grip (120) includes a battery (140) and a wireless communication (150) integral to interior of the activation system (100).

It is contemplated that the activation system may be affixed to end of a vehicle control handlebar via mechanical spiral threading or by mechanical clamp.

It is contemplated that the activation system grip (120) may include a switch or trigger (160) which when enabled, activates and/or controls a vehicle control or safety system. In certain embodiments, the vehicle control or safety system is a brake. In certain embodiments, the vehicle control or safety system is a horn or speaker.

It is contemplated that the activation grip (120) may include a tactile indica (130) such as a raised and/or indented texture to provide feedback to a system user the placement of a switch (160) embedded within or underneath the grip (120).

It is contemplated that the switch is a pressure switch which when sufficient force is applied by a user the switch is either engaged or disengaged.

It is contemplated that the switch 160) is a deformation switch in which when the grip (120) is deformed to a sufficient extent wherein the switch when deformed is either engaged or disengaged.

It is contemplated that the switch (160) is a hall effect magnetic switch in which when a magnet or magnetic conductive material is worn by a system user and when brought into sufficient proximity of the switch (16) either engages or disengages the switch (160).

As depicted in FIG. 5; the activation system (100) may be in communication with an safety or warning audio indica system (500) which may include an "electronic horn" and/or a warning, safety; and/or a headlight capability.

In certain embodiments, the warning audio indica system (500) shown in FIG. 5 is made from pvc/silicone, plastic with metallic silver coating.

In certain embodiments, the warning audio indica system (500) or speaker component has a square speaker face and held in place with an elastic band connected with or integral to a vehicle handlebar.

Figure 6:
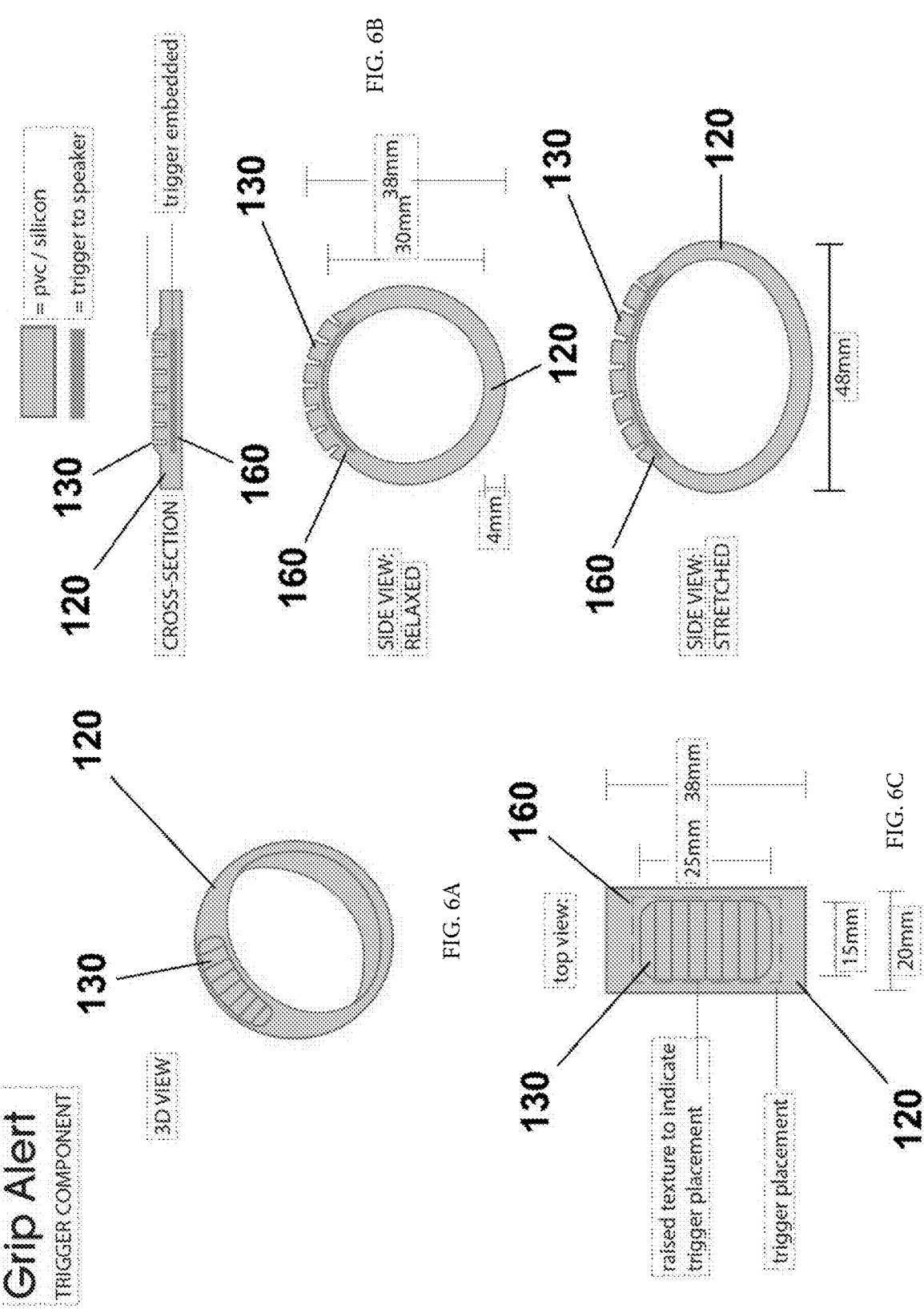
FIGS. 6A-6C depicts orthogonal and cross-sectional depictions of an embodiment of instant invention.

FIGS. 6A-6C shows the trigger component of the system (100). As shown in FIG. 6A, the activation grip (120) includes a tactile indica (130) whereby the tactile indica (130) has a raised texture to indicate trigger placement. As shown in FIG. 6B, a cross section, side view (relaxed) and side view (stretched) are shown. The activation grip (120) is shown being a band that is integral with a vehicle handlebar that can be installed on new vehicles (such as bicycles) or retrofit to existing vehicles.

Figure 7:
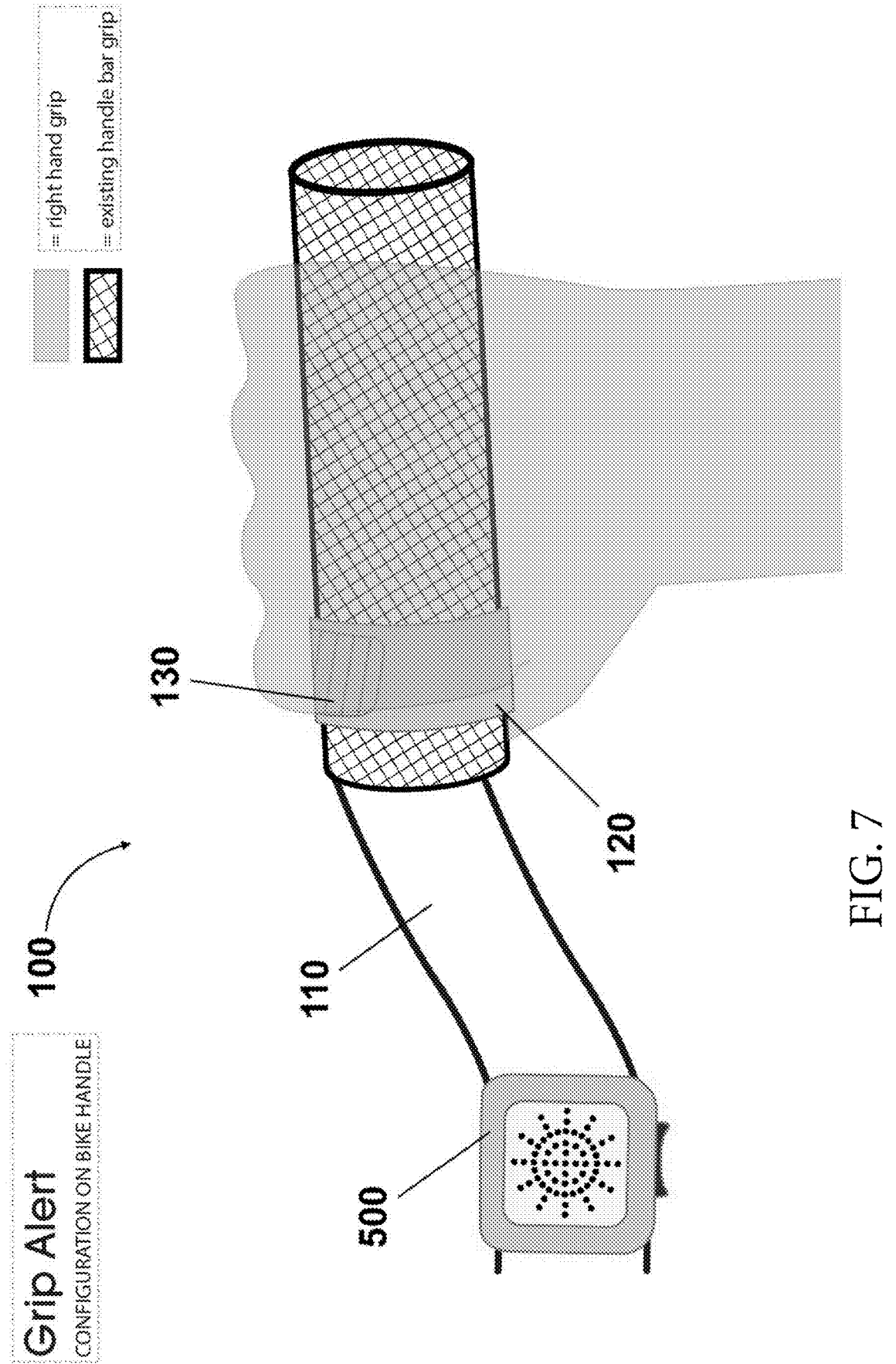
FIG. 7 shows an embodiment whereby the band is configured on a bicycle handlebar.

FIG. 7 shows an embodiment whereby the band is configured on a bicycle handlebar. In this embodiment, the activation grip (120) is shown on vehicle control handle (110).

Figure 8:
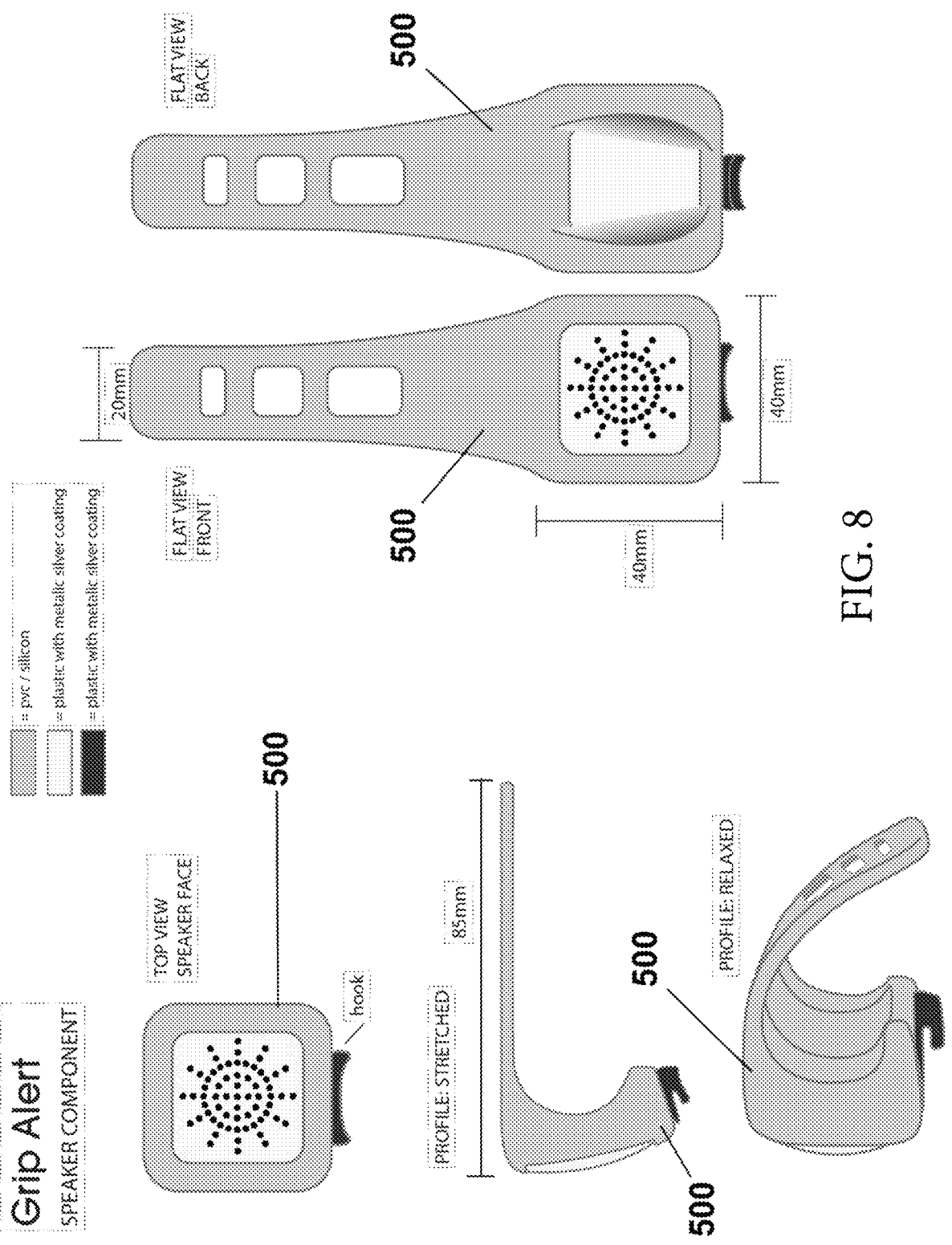
FIG. 8 depicts orthogonal depictions of an embodiment of an audio indica aspect of the instant invention.
Figures 10A, 10B, 10C, 10D:
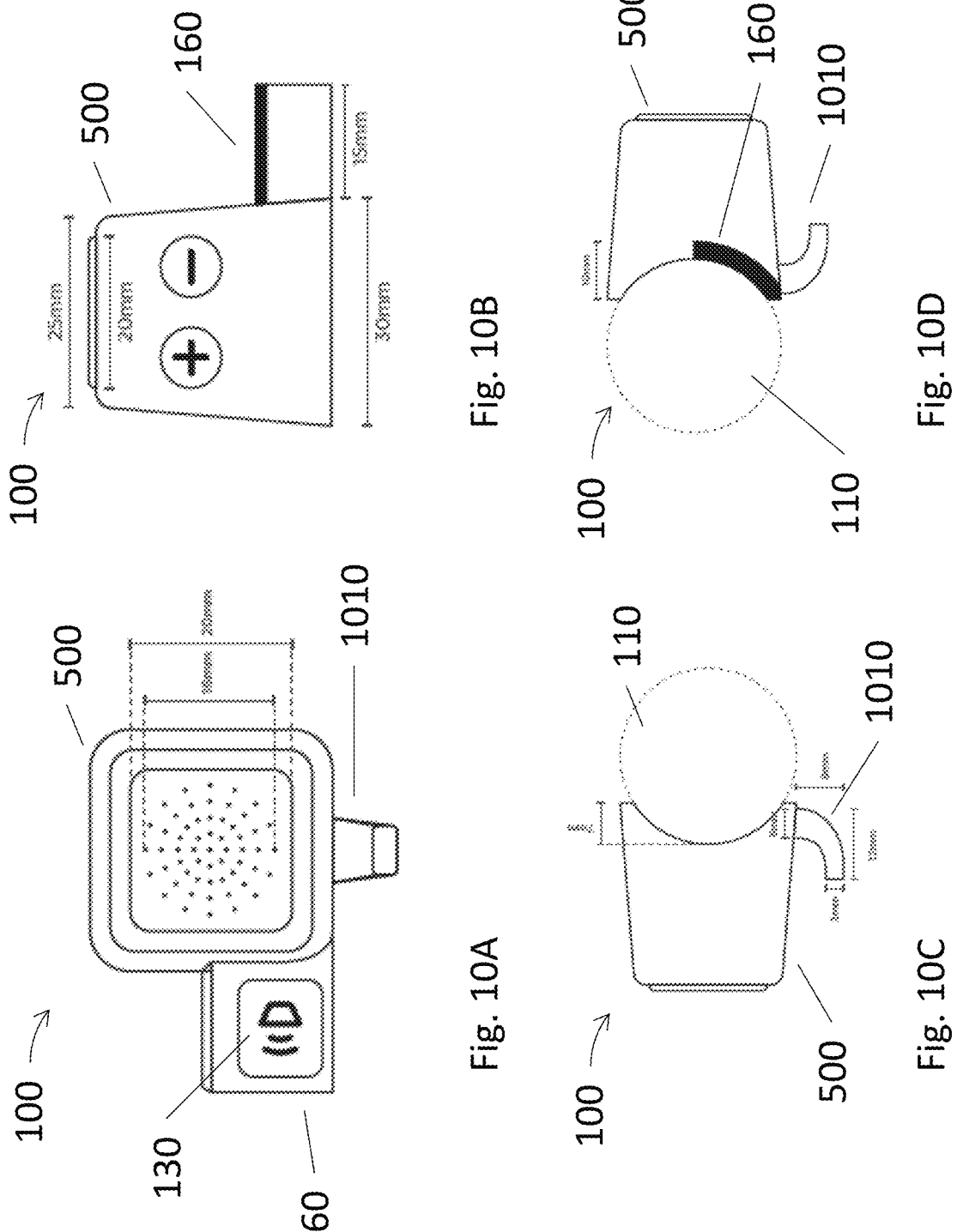
FIGS. 10A-10D depicts top, bottom, left, and right views of an embodiment of the instant invention.
Figure 11:
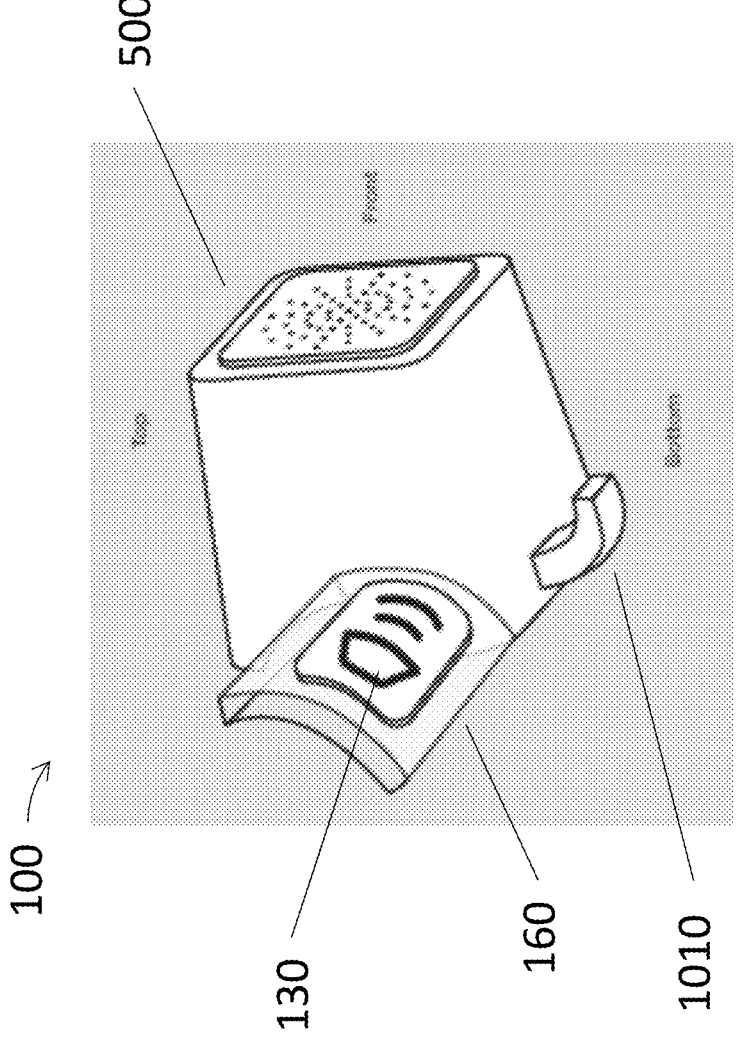
FIG. 11 depicts an orthogonal view of an embodiment of the instant invention.
Figures 12A, 12B:
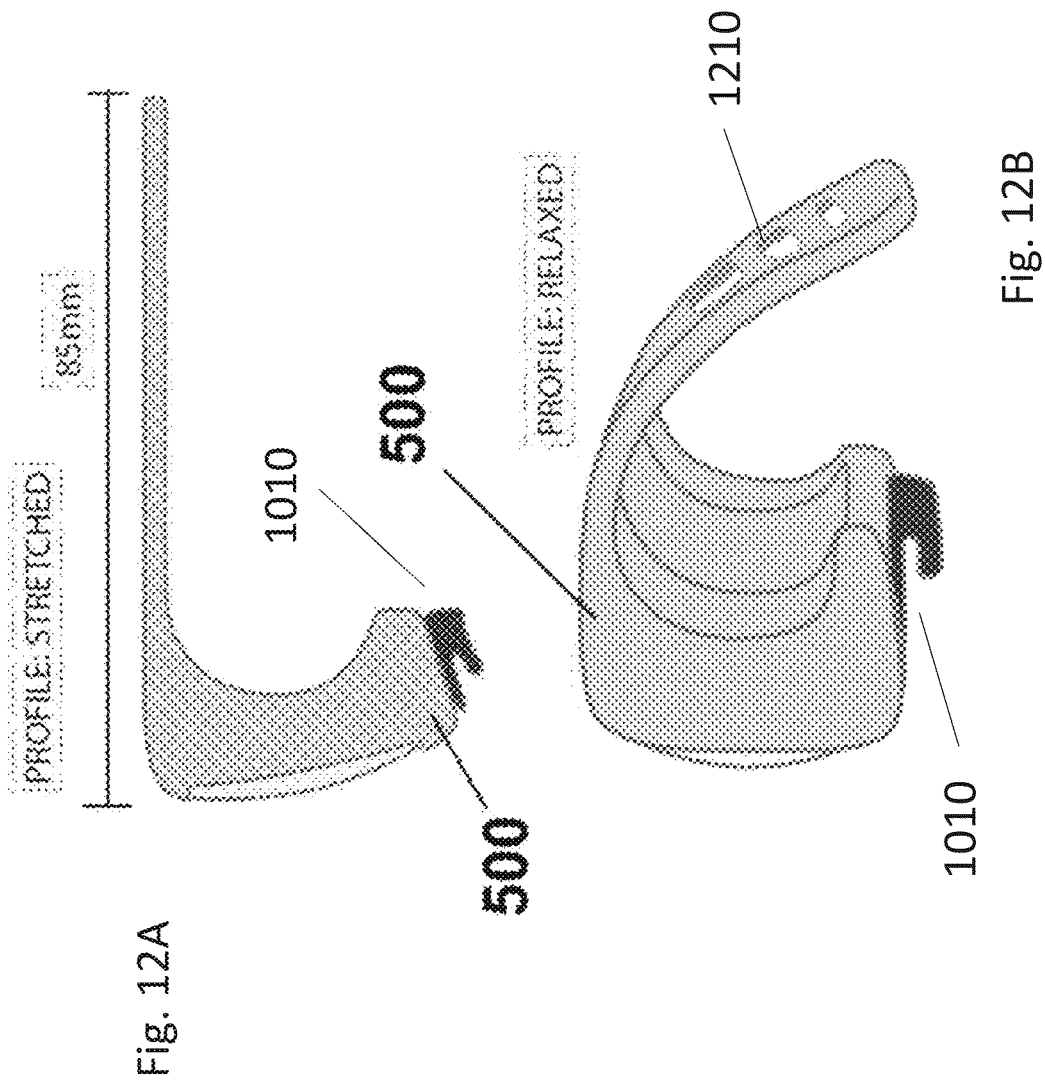
FIGS. 12A-12B depicts a side view and orthogonal view of an embodiment of the instant invention.

FIG. 8 depicts orthogonal depictions of an embodiment of an audio indica aspect of the instant invention. In FIG. 8, the switch or trigger (160) which when enabled, activates and/or controls a vehicle control or safety system. In FIG. 8, the switch or trigger (160) includes a battery located within the switch or trigger (160).

FIGS. 9A-9C shows the trigger component of the system (100). As shown in FIG. 6A, the activation grip (120) includes a tactile indica (130) whereby the tactile indica (130) has a raised texture to indicate trigger placement. As shown in FIG. 9B, a cross section, side view (relaxed) and side view (stretched) are shown. The activation grip (120) is shown being a band that is integral with a vehicle handlebar that can be installed on new vehicles (such as bicycles) or retrofit to existing vehicles.

In certain embodiments, the trigger has a length of 25 mm and a width of 15 mm. in certain embodiments, the switch has a length of 38 mm and a width of 20 mm.

In certain embodiments, the band has a thickness of 4 mm. In certain embodiments, when stretch, the band has a diameter of 48 mm.

In certain embodiments, the band has a height of 30 mm and 38 mm in conjunction with the switch.

In certain embodiments, the band is made of pvc and silicone and has a trigger embedded within the band.

In certain embodiments, the band is portable.

In certain embodiments, the speaker has a square shape and has a height and width of 40 mm respectively.

In certain embodiments, the speaker is connected to an elastic band having a width of 20 mm, and a length of 85 mm when stretched.

In certain embodiments, the instant invention is directed to a combination horn/grip that connects to a handlebar. The grip has an integrated horn within the grip, so that you simply squeeze to make the horn sound. The horn/battery/switch are all integrated into the grip. Again, all four parts (horn/battery/switch/grip) all integrated into one grip.

In certain embodiments, a user simply squeeze to sound the horn, which is the likely natural reaction anyway. This grip can be used on a bicycle, scooter, motorcycle, moped (i.e. any device with grips).

In a certain embodiments, the grip is integrated into a handlebar.

In a certain embodiments, the grip is configured to be retrofit into an existing handlebar.

In a certain embodiments, the device has a wire connected to it, but without the grip. This would be used for road bikes, where you would typically roll grip tape on to your handlebars. This is a device (about 1"×1" and ¼" thick) that mounts to your handlebar and houses the battery and speaker. The wire, with a pressure switch at the end, is run to the "squeeze point" before installing the grip tape. Same concept while riding, simply squeeze to sound the horn.

In an embodiment; as depicted in FIG. 8, FIGS. 10A-10D, FIG. 11, FIGS. 12A-12B, and FIGS. 13A-13E, it is contemplated that the activation system (100) may embody a warning audio indica system (500) removably affixed to (that is "strapped around") a ridged vehicle handlebar (110) powered by a battery (140) and including a switch or trigger (160) which when enabled, activates and/or controls a vehicle safety system including an audible indica (i.e. sound) meant as and functioning as a horn for alerting others to the vehicle's and/or vehicle operator's presence.

In the embodiment, it is contemplated that the switch or trigger (160) includes a tactile indica (130) being a raised and/or indented texture to provide feedback to a system user the placement of a switch (160) embedded within the grip (120).

In the embodiment, it is contemplated that the switch (160) is a deformation pressure switch which when sufficient force is applied by a user, the switch is either engaged or disengaged.

In the embodiment, it is contemplated that the switch (160) is a "momentary on" or "momentary enabled" switch; meaning the warning audio indica system (500) is only energized, engaged, and/or "sounded" when sufficient force or pressure is applied to the switch (160). One the force or pressure is removed from the switch (160) the warning audio indica system (500) is deenergized, disengaged, and/or "silenced".

In the embodiment, the warning audio indica system (500) shown in the Figures is made from a polyvinylchloride and silicone material.

In the embodiment, as depicted in FIG. 8, FIGS. 10A-10D, FIG. 11, FIGS. 12A-12B, and FIGS. 13A-13E, the warning audio indica system (500) has a square speaker face and is removably held in place with and by wrapping an integral silicone band around a vehicle handlebar (110), the silicone band having at least one hole or aperture (1210) through with a catch or hook (1010) integral to the warning audio indica system (500) is passed through to removably secure the warning audio indica system (500) to a vehicle handlebar (110).

In the embodiment, the warning audio indica system (500) is configured to be retrofit kit installed onto an existing handlebar (110) including a handlebar with an existing grip (120) either by a system consumer or by a manufacturer.

In the embodiment of the instant invention (100); as depicted in FIGS. 13A-13E, a warning audio indica system (500) is removably secured to a grip (120) installed on a vehicle left-hand handlebar (110).

Also depicted in FIGS. 13A-13E are a non-inventive left-hand (front tire) brake (finger) handle (1310), and a non-inventive left-hand thumb gear shift control (1320), and a non-inventive system user left-hand (1330).

As depicted in FIGS. 13B-13E, as if viewed sequentially, one may easily appreciate how the inventive warning audio indica system (500) may be utilized by a person (system user) (1330).

Figure 13A:
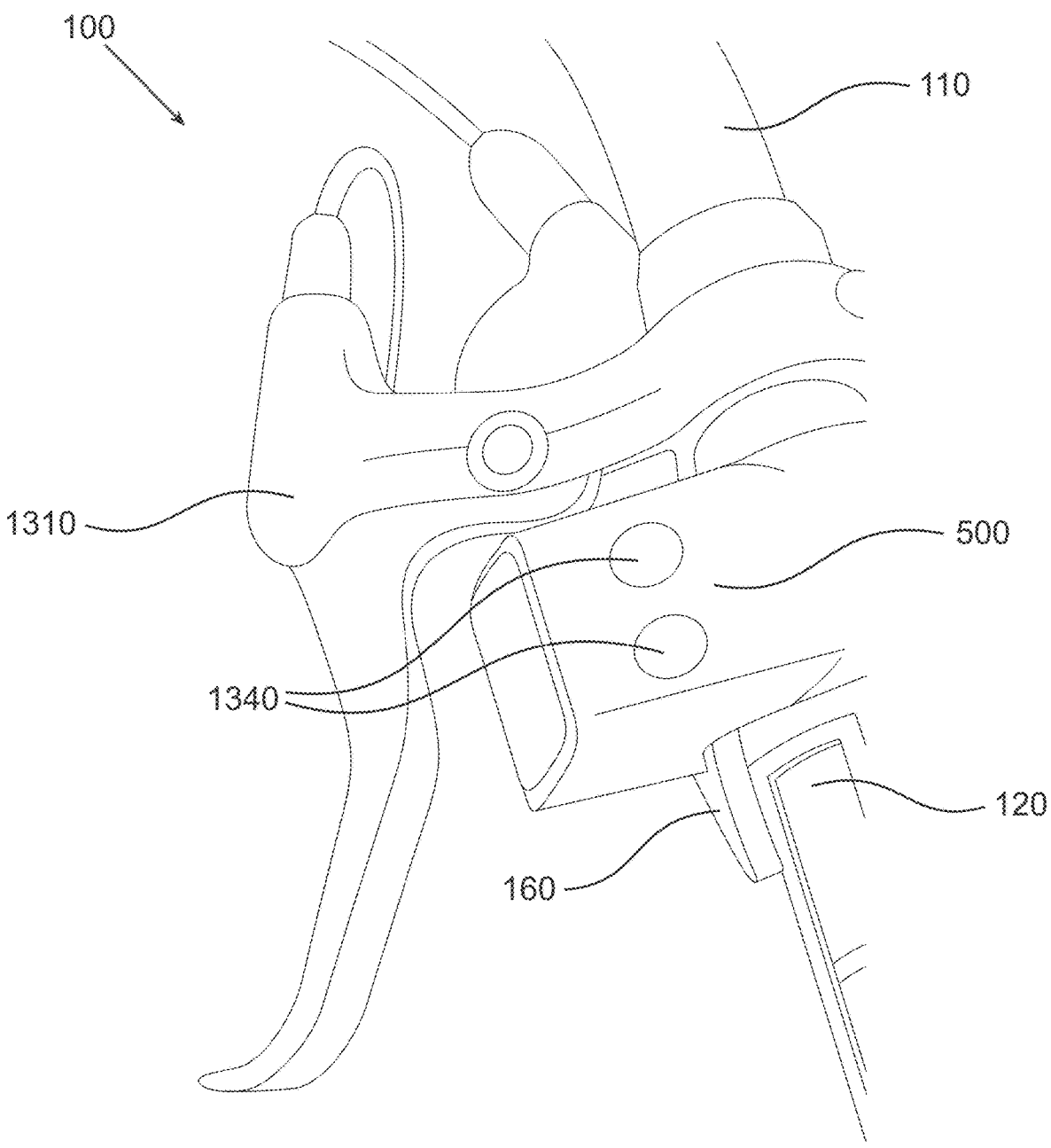
FIGS. 13A-13E and FIGS. 14A-14C depicts a series of views of a person using an embodiment of the instant invention.

Referring to FIG. 13A, the placement of the warning audio indica system (500) preferably would be behind and to the left of an existing handbrake (1310) for a person's left hand (1330). The switch (160) is positioned to be between a person's left-hand (1330) index and/or middle finger(s) and an existing vehicle handlebar (110) and/or existing vehicle grip (120).

Figure 13B:
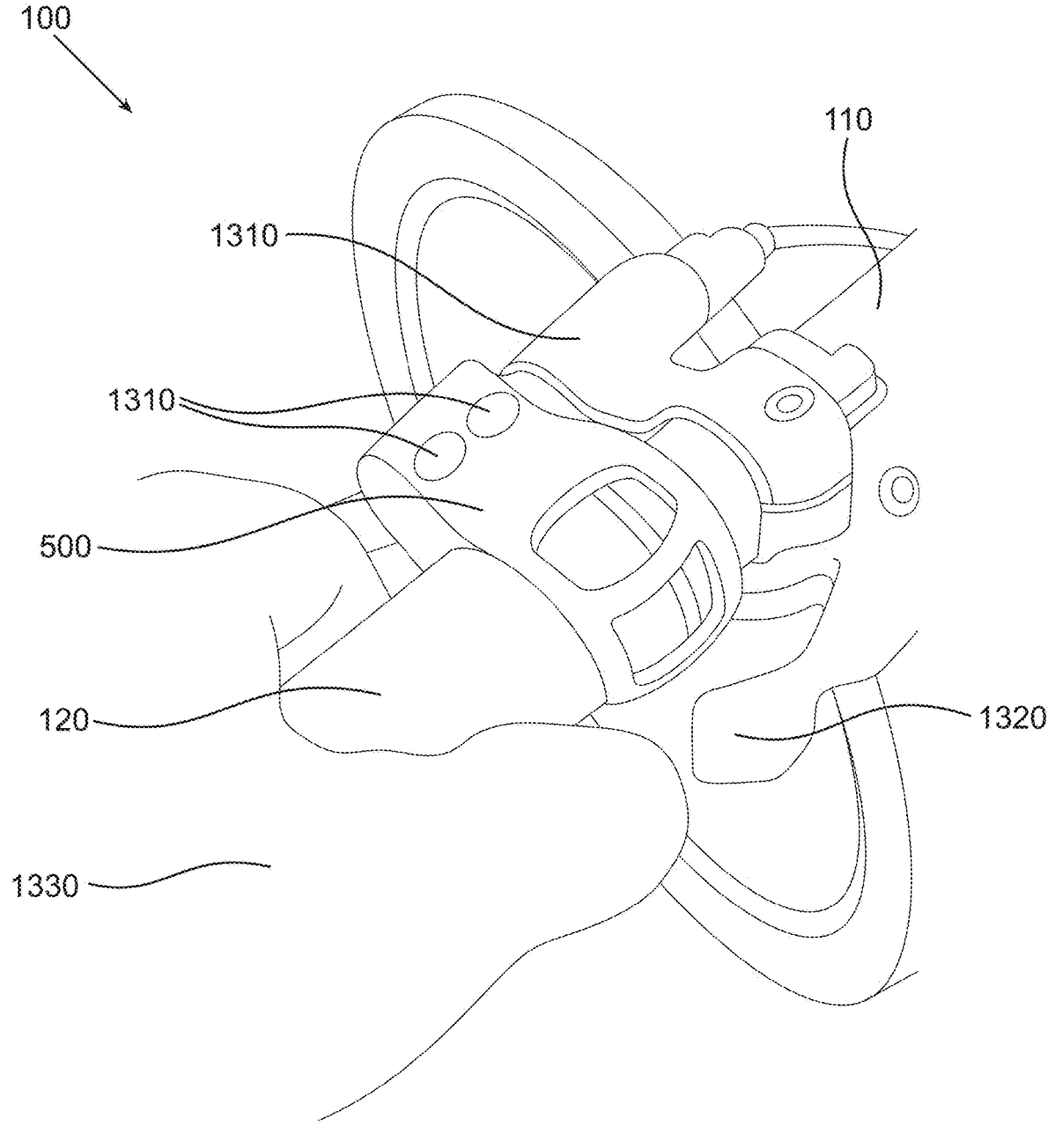
Figure 13C:
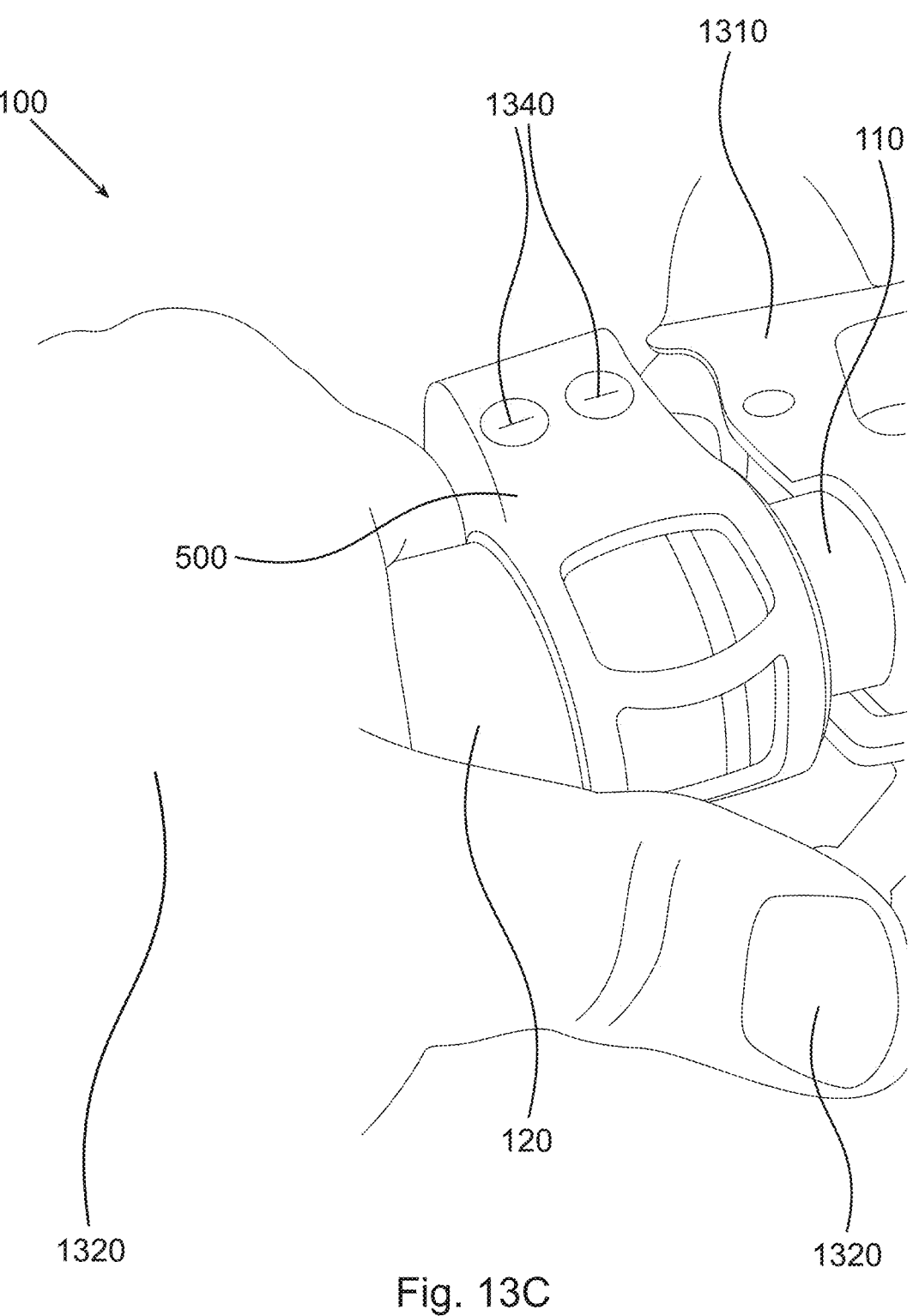

Referring to FIG. 13B and 13C, a person would grasp the vehicle handlebar (110) as is typical and common; with their index and/or middle finger over or on the warning audio indica system (500) switch (160).

Referring to FIG. 13C, it may be appreciated that a person (system user) (1330) may simultaneously activate a gear shift control (1320), grasp a vehicle handlebar (110) and/or grip (120) and while having an index and/or second finger on or about the warning audio indica system (500) switch (160).

Figure 13D:
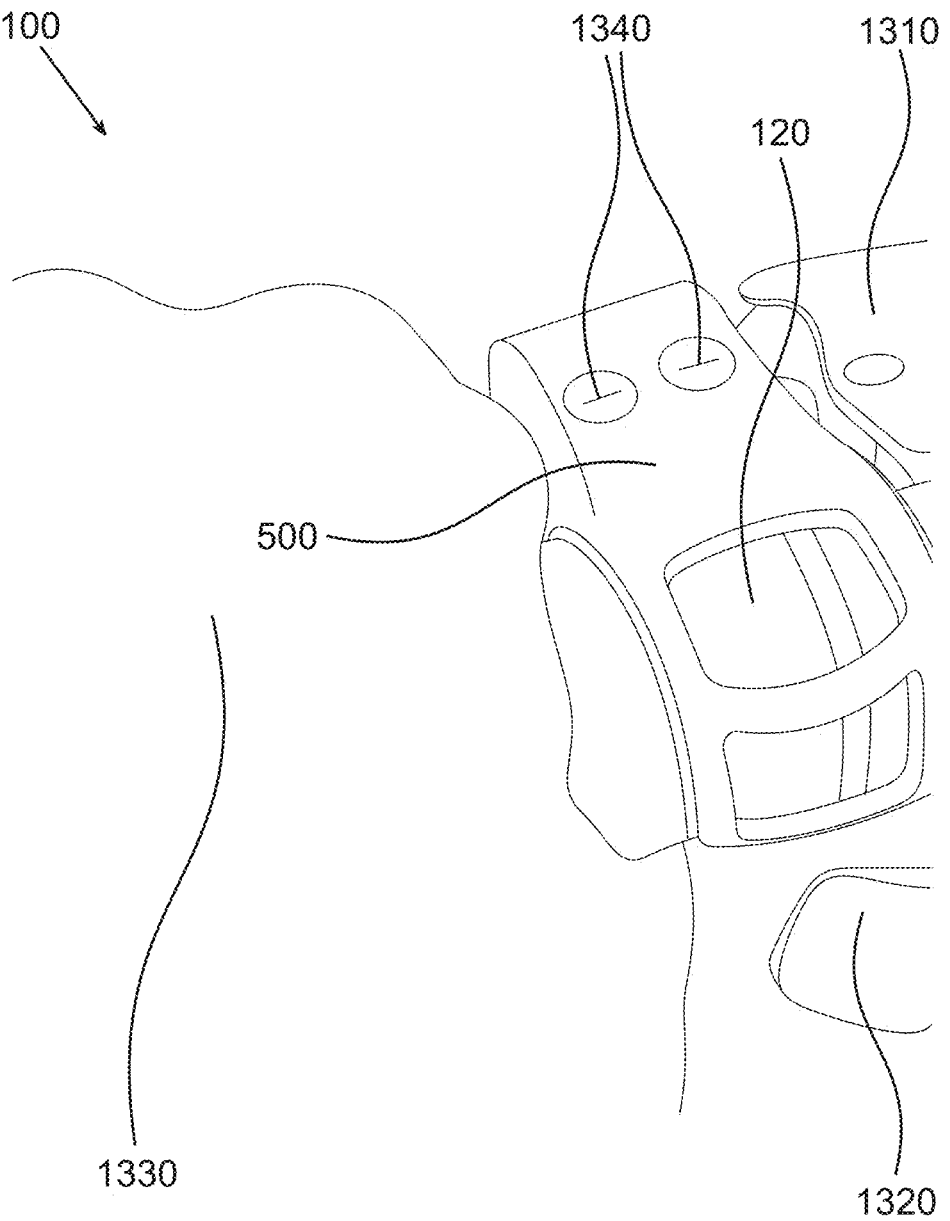
Figure 13E:
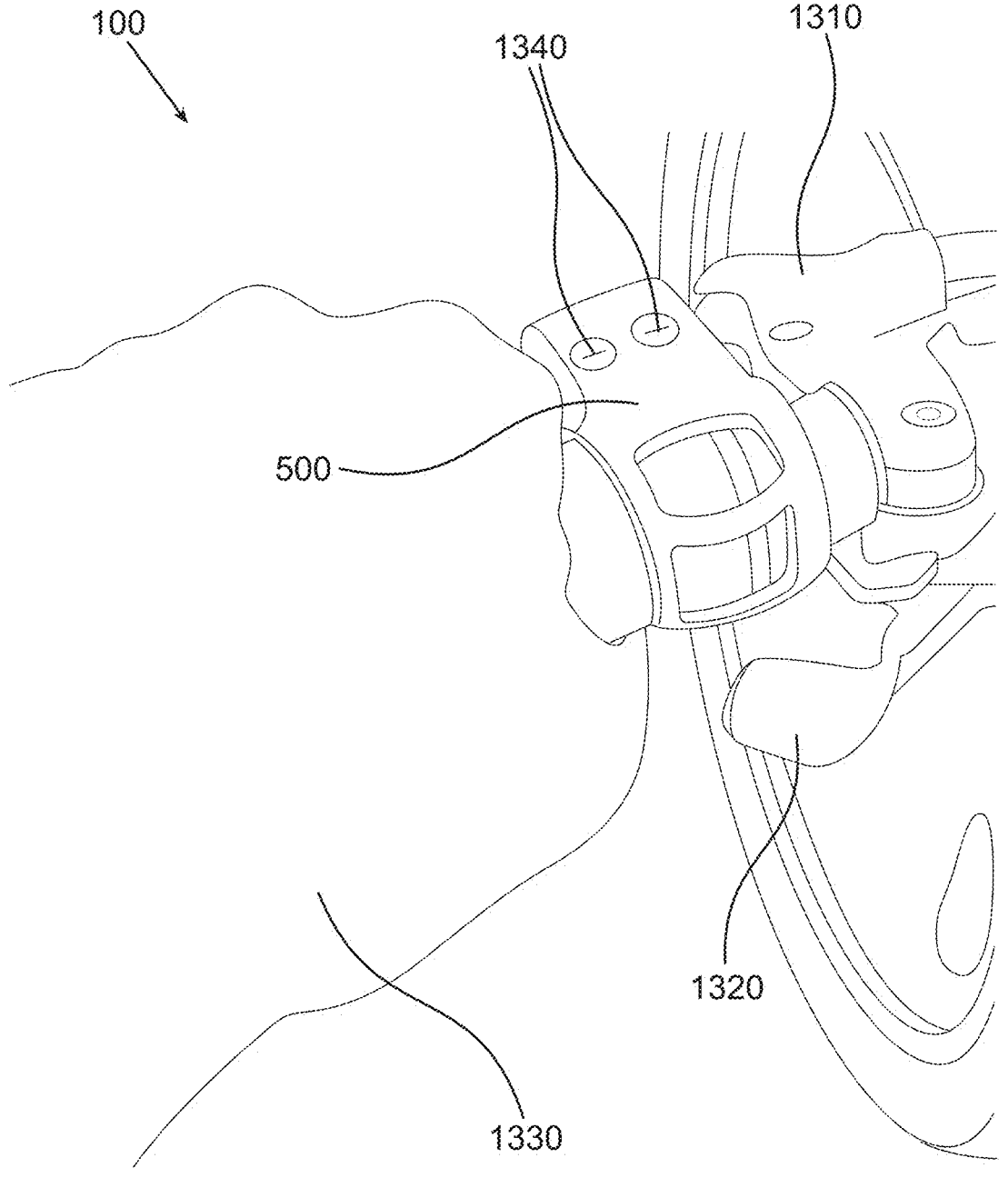

Referring to FIG. 13D, it may be appreciated that a person (system user)(1330) can and may quickly place their index and/or middle finger upon the switch; and as depicted in FIG. 13D, a person may apply pressure and deformation to the switch (160) sufficient to activate and/or deactivate the warning audio indica system (500).

It is contemplated that the embodiment includes controls (1340) to enable a system user to adjust the volume or sound level of the indica emitted from the warning audio indica system (500); in other words; the loudness or volume of the system may be set and adjusted by the system user using the controls.

It is contemplated that the preferred embodiment includes controls (1340) to select differing warning indica types which are audibly emitted from the warning audio indica system (500); in other words; the type of sound emitted by the system may be set and adjusted by the system user. Examples of the audio indica includes, "the classis bicycle bell", a siren type sound, a "car horn" type sound, a voice-like warning "saying" . . . LOOK OUT . . . or . . . COMING THROUGH . . . or the like.

Figure 14A:
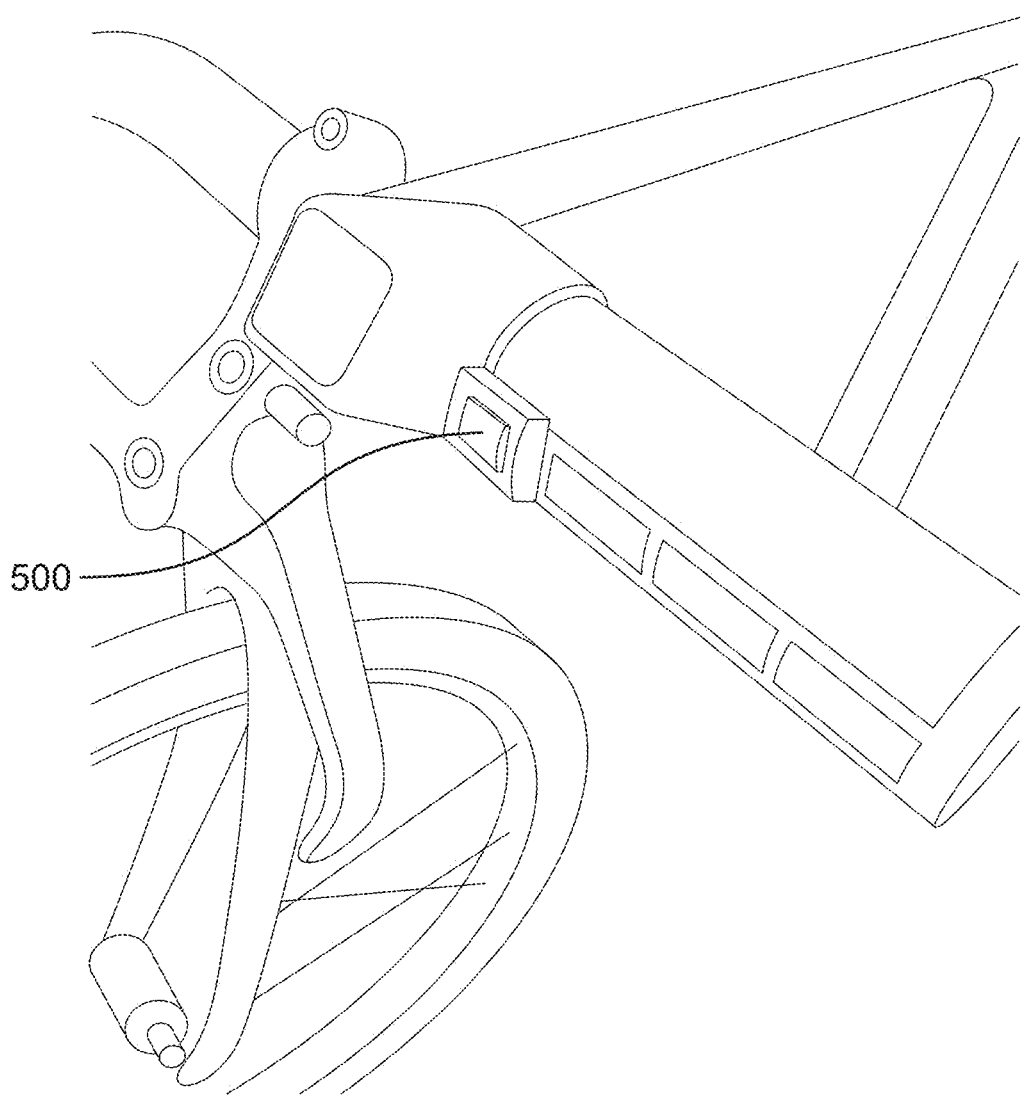
Figure 14B:
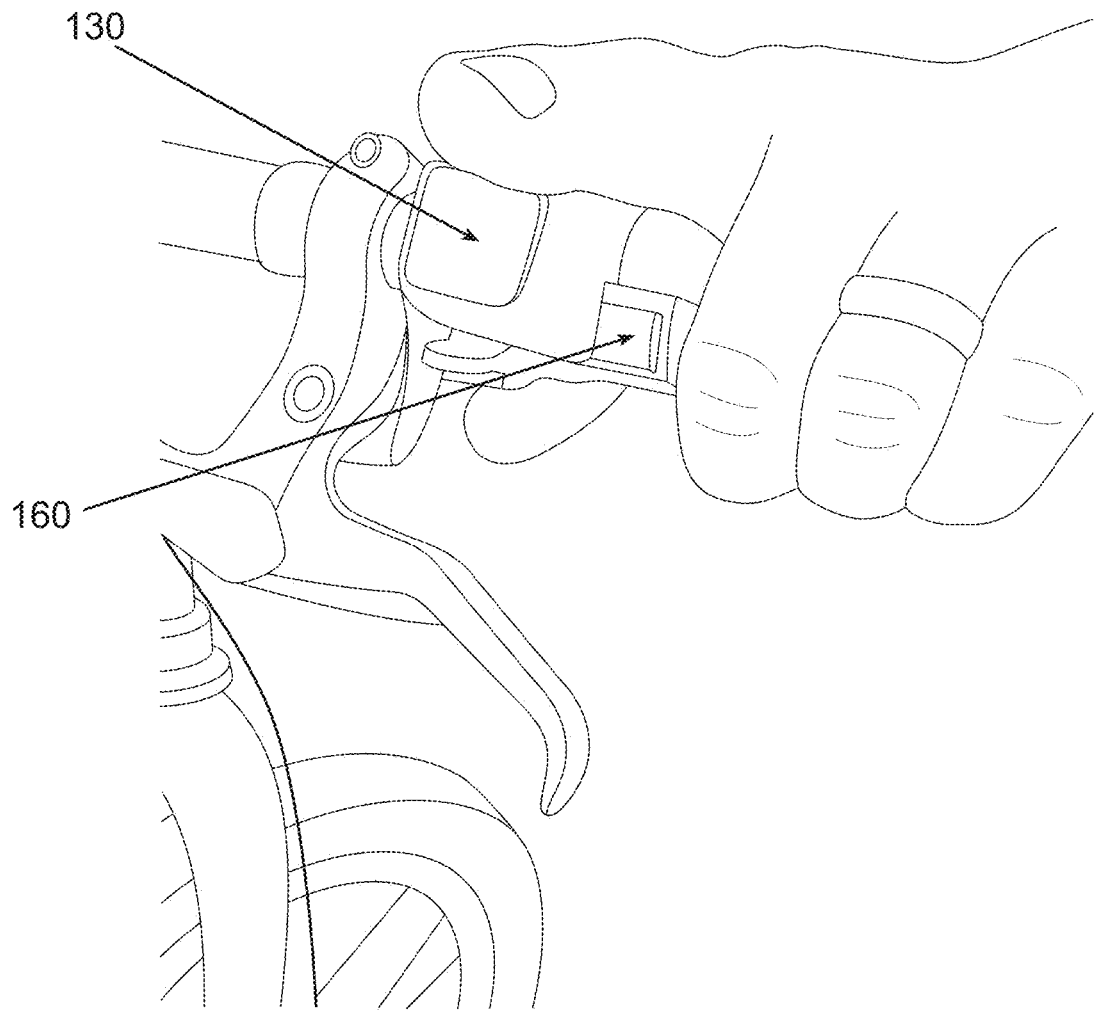
Figure 14C:
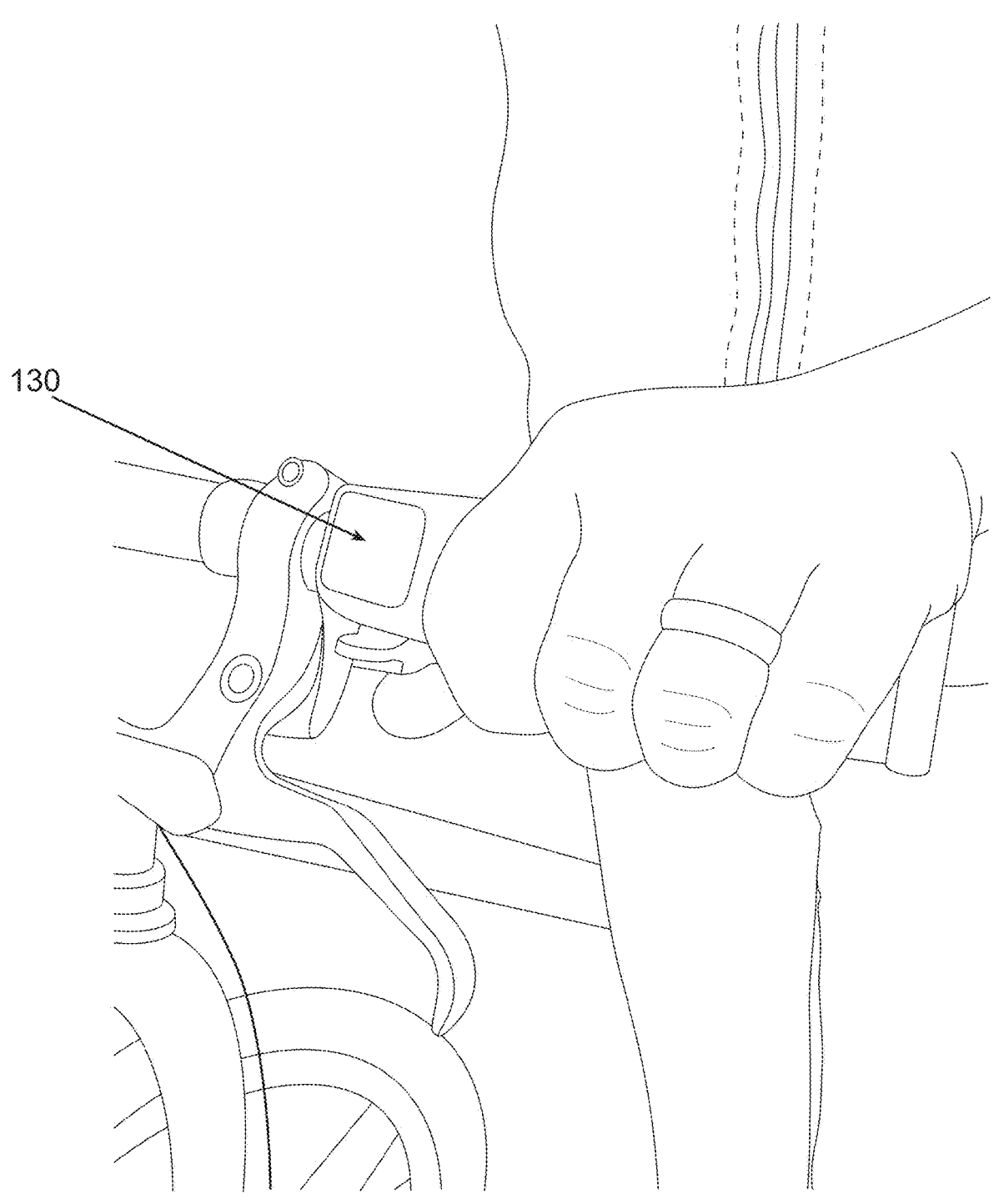

Furthermore, shown in FIG. 14A-14C, a series of views of a person using an embodiment of the instant invention. FIG. 14A shows switch (160) and tactile indica (130). This portrays how the tactile indica (130) can be activated on the switch (160) by pressing with finger without having to moving the hand off the handlebar.

FIG. 14B shows switch (160) and tactile indica (130) conveniently positioned where index finger would wrap around bike handle.

FIG. 14C shows that bike horn can easily and safely be activated while hand is firmly wrapped around handle—that is, without having to move hand or fingers off the handle.

Having thus described several embodiments for practicing the inventive method, its advantages and objectives can be understood. Variations from the drawings and description can be made by one skilled in the art without departing from the scope of the invention, which is to be determined from the following claims.

Accordingly, this invention is not to be limited by the embodiments as shown in the drawings and/or as described in the description, since these are given by way of example only and not by way of limitation.

What is claimed is:

1. A one-piece switch and audio warning system secured on a vehicle control handlebar, the one-piece audio warning system comprising:
   a speaker box;
   a flange element extending in an outboard direction from the speaker box, the flange element having a switch; and
   an attachment element, the attachment element configured to attach the one-piece switch and audio warning system to the vehicle control handlebar,
   wherein the switch is configured to be actuated by a hand of a user without the user moving the user's fingers and/or thumb from a first position on the vehicle handlebar thereby allowing the user to maintain a full fingers and thumb grip on the vehicle handlebar itself while concurrently activating the safety device control while avoiding repositioning the user's hand, fingers, or thumb, thereby increasing user safety;
   wherein when a user engages the switch, the audio warning system is enabled and/or disabled.

2. The system of claim 1, wherein the switch is a pressure sensitive switch of a selected sensitivity which precludes unintentional engagement of the switch during the intended use of the vehicle control handlebar.

3. The system of claim 2, wherein the selected sensitivity is variable as selected by the user.

4. The system of claim 1, wherein the one-piece audio warning system is resistant to water intrusion.

5. The system of claim 1, wherein the one-piece audio warning system is positioned under or within an elastic band including tactile indica of an activation area on the elastic band to facilitate intentional user activation and mitigate unintentional user activation of the switch.

6. The system of claim 1, wherein the one-piece audio warning system is removably affixed to the vehicle control handlebar.

7. The system of claim 1, wherein the one-piece audio warning system comprises a kit for aftermarket installation on an existing vehicle control handlebar.

8. The system of claim 1, wherein the one-piece audio warning system is electronic and powered by a replaceable or nonreplaceable battery.

9. The system of claim 1, wherein the one-piece audio warning system is electronic and powered by a battery which charge is maintained by a photovoltaic cell.

10. The system of claim 1, wherein the one-piece audio warning system is electronic and in wired communication with the switch.

11. The system of claim 1, wherein the attachment element is a stretchable band that wraps around the vehicle control handlebar.

12. The system of claim 1, wherein the attachment element is secured via a buckle.

13. The system of claim 1, wherein the speaker box includes control buttons to increase or decrease the volume of the speaker.

14. A method of activation control of a vehicle warning audio indica system, the method comprising the steps of:

providing the system of claim 1;

removably affixing the system to a vehicle control handlebar; and engaging the switch to enable and/or disable the audio warning system, wherein the engagement of the switch occurs when the user maintains a full grip upon the vehicle control handlebar itself, thereby allowing the user to main a full hand grip on the vehicle control handlebar itself while concurrently activating the audio warning system via the switch.

15. The method of claim 14, wherein the provided switch is a pressure sensitive switch of a selected sensitivity which precludes unintentional engagement of the one-piece audio warning system during the intended use of the vehicle control handlebar.

16. The method of claim 14, where the switch sensitivity is variable and is selected by a user.

17. The method of claim 14, wherein the switch is positioned under or within an elastic band including tactile indica of an activation area on the elastic band to facilitate intentional user activation and mitigate unintentional user activation of the vehicle warning audio indica system.

\* \* \* \* \*